No. 645,762. Patented Mar. 20, 1900.
A. SUNDH.
MEASURING FAUCET.
(Application filed June 24, 1899.)

(No Model.)

Witnesses:
C. L. Belcher
C. Sedgwick

Inventor
August Sundh
By
A. P. Thayer
Attorney

UNITED STATES PATENT OFFICE.

AUGUST SUNDH, OF YONKERS, NEW YORK.

MEASURING-FAUCET.

SPECIFICATION forming part of Letters Patent No. 645,762, dated March 20, 1900.

Application filed June 24, 1899. Serial No. 721,749. (No model.)

*To all whom it may concern:*

Be it known that I, AUGUST SUNDH, a citizen of the United States of America, and a resident of Yonkers, county of Westchester, and State of New York, have invented certain new and useful Improvements in Measuring-Faucets, of which the following is a specification.

My invention is an improvement in faucets for drawing beer or other beverages or liquids by the glass or other small measure in the usual way—that is, without measuring—whereby it may also be utilized for drawing different predetermined quantities in larger measure and will automatically shut off the flow when the desired quantity has been drawn, as hereinafter described, reference being made to the accompanying drawings, in which—

Figure 1:
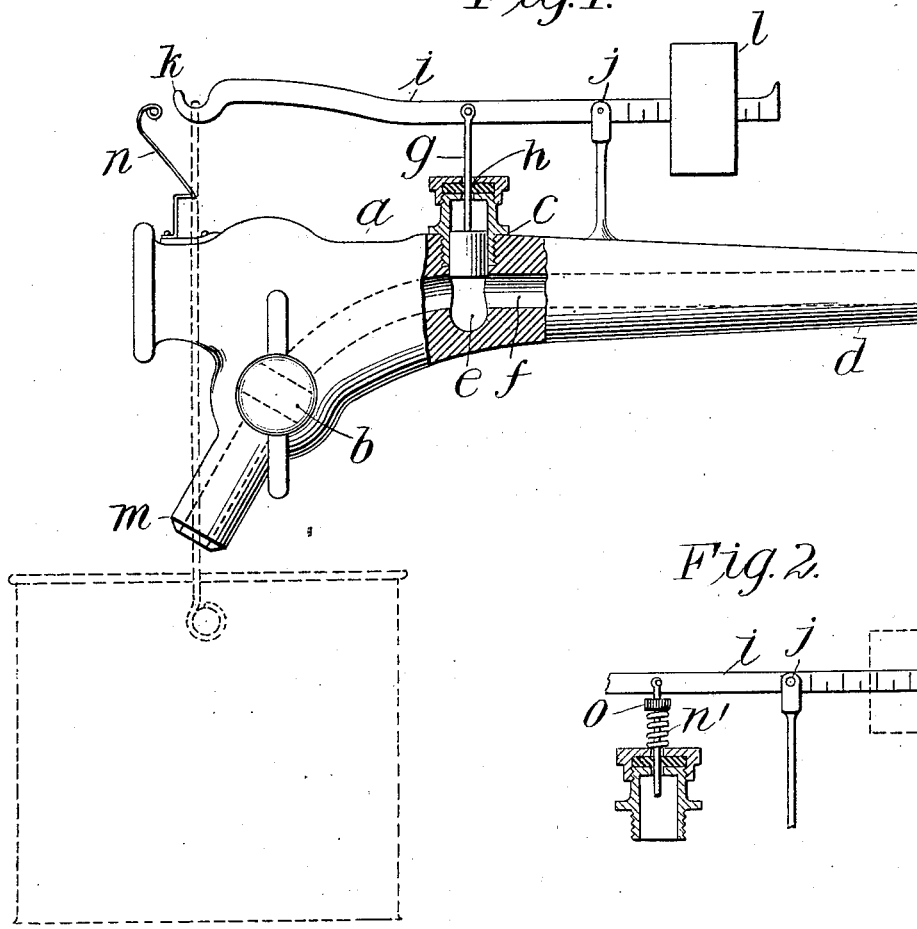
Figure 2:
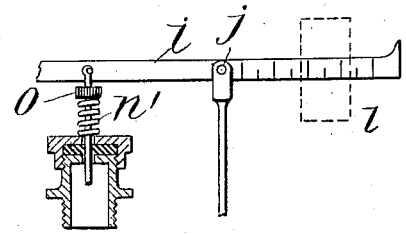

Figure 1 represents a side elevation of my improved faucet with a part in section, showing the automatic shut-off valve and a vessel to be filled, the latter indicated in dotted lines. Fig. 2 is a detail showing a modification of the counterpoise.

My invention is applicable in different forms of construction to any kind or form of beer or other faucet, as will be readily understood from the illustration here given, in which I represent a common beer-tap $a$, provided with a stop-valve $c$. This stop-valve may be of any approved form or construction. In this case I represent a simple form comprising a vertical cylindrical bore $e$ transversely of the vent-passage $f$ and somewhat larger, but not extending quite through the tap, in which bore the corresponding valve $c$ is fitted to slide up and down, the stem $g$ of said valve being connected through a stuffing-box $h$ with a lever $i$, having a fulcrum at $j$ supported on the upper side of the tap, said lever ranging along the tap frontward, where a spring-catch $n$ is provided to engage the lever when the valve is closed and hold it closed, and said lever is provided with a hook $k$ or other suitable device at the extremity, on which to hang a pail or other receptacle, as indicated in dotted lines, to receive the liquid when it is desired to measure the quantity to be drawn and to shut the valve automatically.

On the short arm of the lever is a movable counterpoise $l$, which opens the stop-valve when the spring-catch is released from the lever and holds the valve open until the weight of the quantity drawn overcomes the counterpoise. When drawing small quantities in a glass, the stop-valve will be closed by hand.

The scale of the counterpoise may be graduated to make allowance for the weight of the pail or other receptacle, it being only necessary to approximate such weight.

If desired, a coiled spring $n'$ may be applied to the stem of the valve with a tension-adjusting nut $o$ to be used independently of the counterpoise $l$ or together with it for determining the action of the stop-valve.

The essential function of the stop-valve is to automatically shut off the liquid and prevent overflow of the vessel and waste when the attention of the attendant may happen to be diverted at the moment the vessel becomes full, and it is also especially useful in drawing beer and other foaming liquids that obstruct the view, so that the quantity of liquid cannot be determined by sight, and particularly so when it is only desired to partly fill the receptacle, in which case the counterpoise being adjusted to the known weight of the quantity wanted the supply will be promptly shut off when the predetermined quantity is received although the sight of the liquid may be entirely shut off by the foam. Together with this stop-valve I will also employ, when desired, the ordinary spigot $b$ of a common tap, preferably locating it intermediately of the stop-valve and the discharge-nozzle $m$, whereby with the stop-valve released from the spring-catch and held open by the counterpoise the tap may be used as an ordinary tap for drawing into glasses and the like small quantities not required to be measured. With such a spigot the catch-hook $n$ may be dispensed with, the spigot being closed after the stop-valve closes and before the pail is removed, so that although the stop-valve would open on the removal of the pail the faucet would be closed. The spigot is also useful in connection with the stop-valve, because it is difficult to make the stop-valve sufficiently tight to prevent leak and yet work freely enough to be closed by the weight of the pint measure of beer. By the use of the spigot also it is only necessary to pack the stem of the stop-valve so as not to leak, which may be done without material resistance to the closing because of the small size of the stem, and any leak past the valve will be stopped by the spigot.

If exact measurements are required, a special pail to which the scale of the counterpoise is exactly graduated may be used for drawing and from which the liquid may be transferred to the different vessels of the customers.

Although I prefer to locate the stop-valve intermediately of the spigot and the tap-stem, as herein shown and described, it is obvious that practically the same results may be had with the reverse arrangement, and I do not limit myself in this respect.

What I claim as my invention is—

1. The combination with a faucet-tap, of a stop-valve and a counterpoised lever for operating said valve, said lever pivoted on a standard supported on the tap back of the valve and extending along over the tap suitably for holding the vessel under the nozzle for receiving the draft, and connected to the valve for automatically closing it by the weight of the predetermined quantity of the draft.

2. The combination with a faucet-tap, of a stop-valve, a counterpoised lever for operating said valve, said lever pivoted on a standard supported on the tap back of the valve and extending along over the tap suitably for holding the vessel under the nozzle for receiving the draft, and for automatically closing it by the weight of the predetermined quantity of the draft, and also for opening said valve, and the spring-catch on the front end of the tap for engaging the lever to hold the valve closed.

Signed by me at New York, N. Y., this 15th day of June, 1899.

AUGUST SUNDH.

Witnesses:
   A. P. THAYER,
   C. SEDGWICK.